United States Patent
Keech

(10) Patent No.: US 9,732,728 B2
(45) Date of Patent: Aug. 15, 2017

(54) WIND TURBINE ASSEMBLY

(71) Applicant: The Power Collective Ltd, Whitby (GB)

(72) Inventor: Winston Donald Keech, Whitby (GB)

(73) Assignee: The Power Collective Ltd, Bleach Garth, Littlebeck, Whitby (GB)

( * ) Notice: Subject to any disclaimer, the term of this patent is extended or adjusted under 35 U.S.C. 154(b) by 0 days.

(21) Appl. No.: 14/384,568

(22) PCT Filed: Mar. 12, 2013

(86) PCT No.: PCT/GB2013/050604
§ 371 (c)(1),
(2) Date: Sep. 11, 2014

(87) PCT Pub. No.: WO2013/136060
PCT Pub. Date: Sep. 19, 2013

(65) Prior Publication Data
US 2015/0017006 A1 Jan. 15, 2015

(30) Foreign Application Priority Data

Mar. 12, 2012 (GB) .................................. 1204339.4

(51) Int. Cl.
*F03D 3/06* (2006.01)
*F03D 3/04* (2006.01)
(Continued)

(52) U.S. Cl.
CPC ............. *F03D 3/061* (2013.01); *F03D 3/002* (2013.01); *F03D 3/04* (2013.01); *F03D 11/00* (2013.01);
(Continued)

(58) Field of Classification Search
CPC . F03D 3/002; F03D 3/04; F03D 3/061; F03D 3/065; F03D 3/049; F03D 11/00;
(Continued)

(56) References Cited

U.S. PATENT DOCUMENTS 5,151,014 A * 9/1992 Greenwald ............... B64C 3/58
416/237
6,638,005 B2 * 10/2003 Holter ..................... F03D 3/005
415/151
(Continued)

FOREIGN PATENT DOCUMENTS

DE    10105570    8/2002
GB    2472660     2/2011
(Continued)

OTHER PUBLICATIONS

Klemm et al., Application of a cross flow fan as a wind turbine, Journal of Computational and Applied Mechanics, vol. 8 No. 2 (2007), pp. 123-133.
(Continued)

*Primary Examiner* — Edward Look
*Assistant Examiner* — Danielle M Christensen
(74) *Attorney, Agent, or Firm* — Garvey, Smith, Nehrbass & North, L.L.C.; Seth M. Nehrbass; Vanessa M. D'Souza

(57) ABSTRACT

A wind turbine assembly comprising a generally cylindrical wind turbine rotor that is supported by a rotor support and operable to rotate about a rotational axis, the rotor comprising a plurality of aerofoil blades with each aerofoil blade having a leading edge, a trailing edge, a suction surface, a pressure surface, and an aerofoil chord having a chord length between the leading edge and the trailing edge, the aerofoil blades being in a generally cylindrical arrangement around the rotational axis with the leading edges at a larger radial separation from the rotational axis than the trailing edges,
(Continued)

and the chords being angled relative to radii through the rotational axis such that the suction surfaces and pressure surfaces respectively face generally outwardly and inwardly from and to the rotational axis, wherein the minimum separation (S) between the leading edge of a first aerofoil and the suction surface of an adjacent aerofoil is less than the chord length ($L_C$), and wherein the location of the maximum thickness of each aerofoil blade ($L_{Tmax}$) along the chord ($L_C$)) is less than 20% of the chord length (L) from the leading edge.

16 Claims, 4 Drawing Sheets

(51) Int. Cl.
*F03D 3/00* (2006.01)
*F03D 11/00* (2006.01)

(52) U.S. Cl.
CPC ... *F05B 2240/231* (2013.01); *F05B 2240/301* (2013.01); *F05B 2240/9112* (2013.01); *Y02B 10/30* (2013.01); *Y02E 10/728* (2013.01); *Y02E 10/74* (2013.01)

(58) Field of Classification Search
CPC .. F03D 11/04; F03D 11/045; F05B 2240/121; F05B 2240/13; F05B 2240/2212; F05B 2240/911
See application file for complete search history.

(56) References Cited

U.S. PATENT DOCUMENTS

| | | |
|---|---|---|
| 2005/0248160 A1 | 11/2005 | Watkins |
| 2008/0131273 A1* | 6/2008 | Fuller ............................ 415/203 |
| 2010/0003130 A1* | 1/2010 | Gual ..................... F03D 3/0409 415/191 |
| 2011/0187117 A1* | 8/2011 | Hess ...................... B60K 16/00 290/55 |
| 2011/0318167 A1 | 12/2011 | Miller |
| 2013/0026761 A1* | 1/2013 | Rajadhyaksha et al. ....... 290/54 |

FOREIGN PATENT DOCUMENTS

| | | |
|---|---|---|
| KR | 20110107940 | 10/2011 |
| WO | WO2006095369 | 9/2006 |
| WO | WO2011/013105 A2 | 3/2011 |
| WO | WO2012028893 | 3/2012 |

OTHER PUBLICATIONS

UK Intellectual Property Office Search Report under Section 17, Jun. 29, 2012.
Notification of transmittal of the International Search Report and Written Opinion of the International Searching Authority, Jun. 17, 2013.

* cited by examiner

WIND TURBINE ASSEMBLY

The present invention relates to a wind turbine assembly having a generally cylindrical wind turbine rotor, and more particularly such a wind turbine assembly that is supported within a rotor housing.

BACKGROUND

A known design of wind turbine has a tower-mounted propeller-like rotor, typically comprising two or three blades that radiate perpendicular to the axis of rotation of the rotor, which is generally aligned with the prevailing wind direction. Other known designs of wind turbine have blades arranged in a frame or cage and the blades extend along the axis of rotation of the rotation, which is aligned transverse to the prevailing wind direction. Examples of the latter are Savonius rotors or Darrieus rotors, as described in U.S. Pat. No. 1,697,574 and U.S. Pat. No. 1,835,018 respectively, as well as a basic paddle-wheel type of rotor.

Wind turbines are typically designed to maximise their power output in relatively high wind speed conditions. However, under substantially laminar flow, aerodynamic lift of an aerofoil increases approximately quadratically with relative wind speed. Accordingly, and disadvantageously, such wind turbines are vulnerable to damage in extremely high winds, and produce low power output in low wind speeds.

Control of rotor rotational speed is of critical importance, and can be particularly challenging during extremely high wind speeds. Accordingly, wind turbines are typically provided with control mechanisms in the form of control electronics, braking systems, or shuttering or regulation elements to shield the rotor from the wind.

Disadvantageously, wind turbines are vulnerable to damage in the case of a failure or disconnection of their control electronics, which can result in their spinning out of control, dramatically increasing component wear and reducing the lifetime of the wind turbine.

Disadvantageously, during highly variable wind conditions high torques can be produced suddenly causing to accelerate more rapidly than their control electronics and/or braking systems can respond or to exceed the braking capacity available. This problem has most notably arisen in relation to large-scale wind turbines having propeller-like rotors.

There has been increasing interest in mounting wind turbines on the roof ridges of buildings, to take advantage of the wind focus effect, by which the wind passing up a roof to a ridge is compressed into a high speed Aeolian flow band. Empirical measurement has shown that for a usual 30 degree to 45 degree pitched roof, this band extends approximately 300 mm above the ridge top and 450 mm forward along the roof facing the incident wind. At this point, measured speeds may be of the order of three times that of the prevailing wind speed. However, the unpredictable aerodynamic influences of nearby buildings and trees can lead to variable wind conditions, complicating wind turbine design.

WO2011010159 discloses a roof ridge mountable wind turbine having an elongate cylindrical wind turbine rotor, a variable flow regulator within the rotor housing, and a control system, such that the regulator can be used to variably reduce the wind flow through the rotor. It is also known to provide shutters that can be closed in high wind conditions.

Disadvantageously, such flow regulator mechanisms increase the manufacturing complexity and cost of the wind turbines. Further, due to the mechanical demands that such mechanisms require to withstand, they typically require robust engineering that increases the weight of the wind turbine assembly, increasing installation complexity and cost, as well as restricting the number of roofs on which they can be installed due to limitations of the maximum load that each roof can bear.

Accordingly, there remains a need for a reliable, lower weight and low complexity wind turbine assembly that can withstand high wind conditions.

SUMMARY OF THE DISCLOSURE

According to an aspect of the present invention, there is provided, a wind turbine assembly comprising a generally cylindrical wind turbine rotor that is supported by a rotor support and operable to rotate about a rotational axis, the rotor comprising a plurality of aerofoil blades with each aerofoil blade having a leading edge, a trailing edge, a suction surface, a pressure surface, and an aerofoil chord having a chord length between the leading edge and the trailing edge, the aerofoil blades being in a generally cylindrical arrangement around the rotational axis with the leading edges at a larger radial separation from the rotational axis than the trailing edges, and the chords being angled relative to radii through the rotational axis such that the suction surfaces and pressure surfaces respectively face generally outwardly and inwardly from and to the rotational axis, wherein the minimum separation (S) between the leading edge of a first aerofoil and the suction surface of an adjacent aerofoil is less than the chord length ($L_C$).

Advantageously, the output torque at extremely high wind speeds may be automatically limited without the need for extra moving parts, such as a separate flow regulator or shutter. The requirements for the strength of any brake may be reduced (the requirement for a brake may even be avoided). The wind turbine assembly may be less vulnerable to rapid changes in incident wind speed, reducing the requirements for the speed of response of any braking mechanism that might be used with the rotor. The electrical output power variation during unsteady high wind speeds may be reduced. By avoiding the need for an air flow regulator, the rotor may be designed with a greater mass of blades (for a wind turbine assembly having the same mass), providing the rotor with a correspondingly higher moment of inertia, which may further stabilise the rotational speed of the rotor and the power output. Advantageously, the provision of a greater number of blades on the rotor, arranged close together, may increase the output power at low wind speeds.

The location of the maximum thickness of each aerofoil blade ($L_{Tmax}$) along the chord may be less than 20% of the chord length ($L_C$) from the leading edge. The location of the maximum thickness of each aerofoil blade ($L_{Tmax}$) along the chord may be less than 15% of the chord length ($L_C$) from the leading edge. The location of the maximum thickness of each aerofoil blade ($L_{Tmax}$) along the chord may be less than 10% of the chord length ($L_C$) from the leading edge. Advantageously, turbulence onsets at a lower incident wind speed when the maximum thickness ($T_{max}$) of the aerofoil is closer to the leading edge, and so the threshold wind speed may further be selected by choice of the location of the maximum thickness of the aerofoil blade ($L_{Tmax}$).

The location of the maximum thickness of each aerofoil blade ($L_{Tmax}$) along the chord may be at least 6% of the chord length ($L_C$) from the leading edge. Below 6%, the aerodynamic lift/aerodynamic drag ratio is substantially reduced, and the aerofoil performs less at windspeeds within the range of windspeeds that would typically be incident on such a wind turbine assembly, and at the angle of incidence to the blades at which the wind would typically meet the rotor.

The location of the maximum thickness of each aerofoil blade ($L_{Tmax}$) along the chord may be at least 6% and less than 10% of the chord length ($L_C$) from the leading edge. Advantageously, locations in this range provide the highest aerodynamic performance.

Reducing the separation of adjacent aerofoil blades (as determined by the separation (S) between the leading edge of a first aerofoil and the suction surface of an adjacent aerofoil) reduces the threshold incident wind speed. However, with the corresponding increase in the density of blades, the aerodynamic drag also increases. Advantageously, the separate choices of both the location of the maximum thickness of the aerofoil blade ($L_{Tmax}$) and the separation (S) between the leading edge of a first aerofoil and the suction surface of an adjacent aerofoil enables a degree of independence in determining the threshold wind speed and the aerodynamic drag, which combination advantageously facilitates enhanced optimisation of the aerodynamic performance of the rotor.

The maximum chord thickness ($T_{max}$) of the aerofoil blade may be 5 to 15% of the chord length ($L_C$). Such a maximum chord thickness/chord length ratio provides an advantageous compromise between providing high lift at low incident wind speed, to enhance output power in low wind conditions, and inducing lift-destroying turbulence between adjacent blades of the rotor at high incident wind speeds, to prevent excessive rotational speeding of the rotor.

The coefficient of lift ($C_L$) of the aerofoil blade may have a value of at least 1.7 across an angle of incidence range (i.e. the angle of incidence acceptance range) of at least 15 degrees. Advantageously, such a coefficient of lift ($C_L$) profile provides a consistently high level of lift as each rotor blade sweeps across the opening in the front of the housing.

The chord thickness, including the maximum chord thickness ($T_{max}$), is defined by measurement perpendicular to the chord.

The blades may be substantially parallel with the rotational axis. Advantageously, straight blades are less complex to manufacture.

The minimum separation (S) may be less than 85% of the chord length ($L_C$). The minimum separation (S) may be less than 70% of the chord length ($L_C$). The minimum separation (S) may greater than 30% of the chord length ($L_C$). The minimum separation (S) may be greater than 50% of the chord length ($L_C$). Advantageously, turbulence onsets at lower wind speeds for smaller separations (S), and so the threshold wind speed may be selected by choice of separation (S).

The aerofoil blades may be cambered aerofoil blades. The rotor may comprise 16 or more aerofoil blades. The rotor may have a diameter of 300 to 1000 mm. The blades may have a chord length of 50 to 200 mm.

The rotor support may comprise a rotor housing and the rotor may be rotatably supported within the rotor housing.

The rotor housing may have an inlet air deflection slat configured to channel air flow incident into the rotor away from the support. Advantageously, such a slat may enhance concentration of the air flow to the rotor.

The rotor housing may have an outlet air deflection slat configured to channel air flow existing the rotor away from the support. Advantageously, such a slat may enhance air flow diffusion away from the rotor.

The rotor support may be shaped in correspondence with the apex of a pitched roof. Advantageously, such an assembly is particularly suitable for use on buildings, where it receives the higher speed air flow concentrated into an Aeolian flow band.

BRIEF DESCRIPTION OF THE DRAWINGS

Embodiments of the invention are further described hereinafter with reference to the accompanying drawings, in which.

DETAILED DESCRIPTION

Figure 1A:
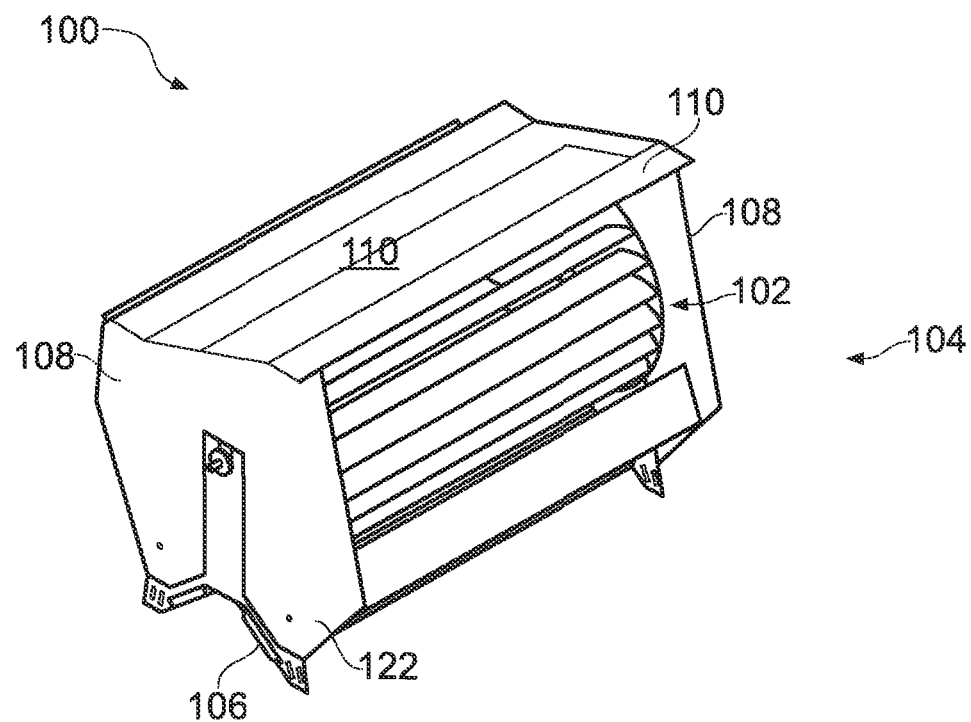
FIG. 1A shows a perspective view of an assembled wind turbine assembly according to the present invention.

Like reference numerals refer to like elements throughout, albeit in some cases having one or more suffix letters. For example, in different figures, 108, 108A and 108B have been used to indicate an end panel and its component parts, and similarly 130, 130A and 130B have been used to indicate aerofoil blades in general and two blades in particular.

FIGS. 1A to 1D show views of a wind turbine assembly 100 comprising an elongate generally cylindrical wind turbine rotor 102 rotatably mounted within a housing 104.

The housing 104 comprises a base section 106, end panels 108 and a cover 110. Conveniently, the housing 104 can be disassembled into lower and upper housing parts 104A and 104B, such that the lower housing part, rotor 102 and upper housing part may be separately and successively installed onto a roof. The end panels have a composite construction, with component parts 108A and 108B provided by the upper and lower housing parts 104A and 104B.

The lower housing part 104A is configured for mounting on the apex of a pitched roof 112.

Figure 1C:
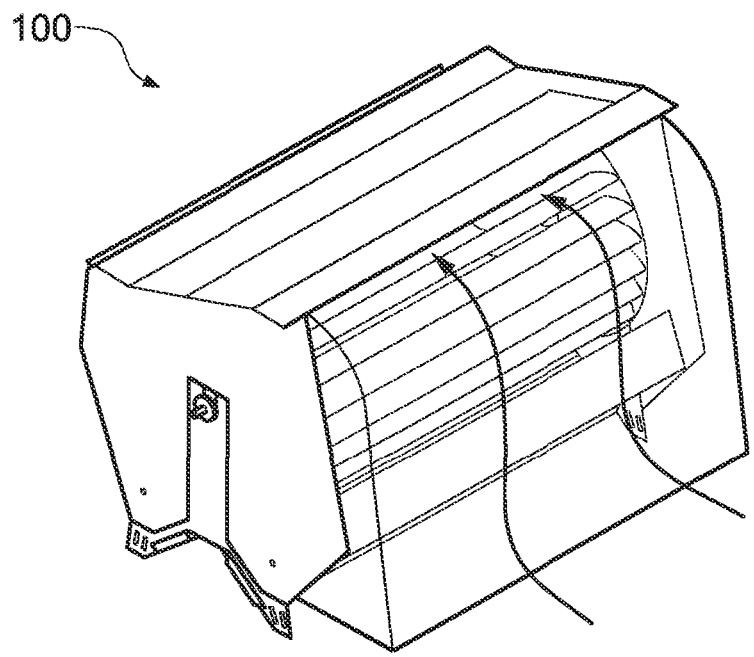
FIG. 1C shows the air flow approaching a wind turbine assembly according to the present invention.
Figure 1B:
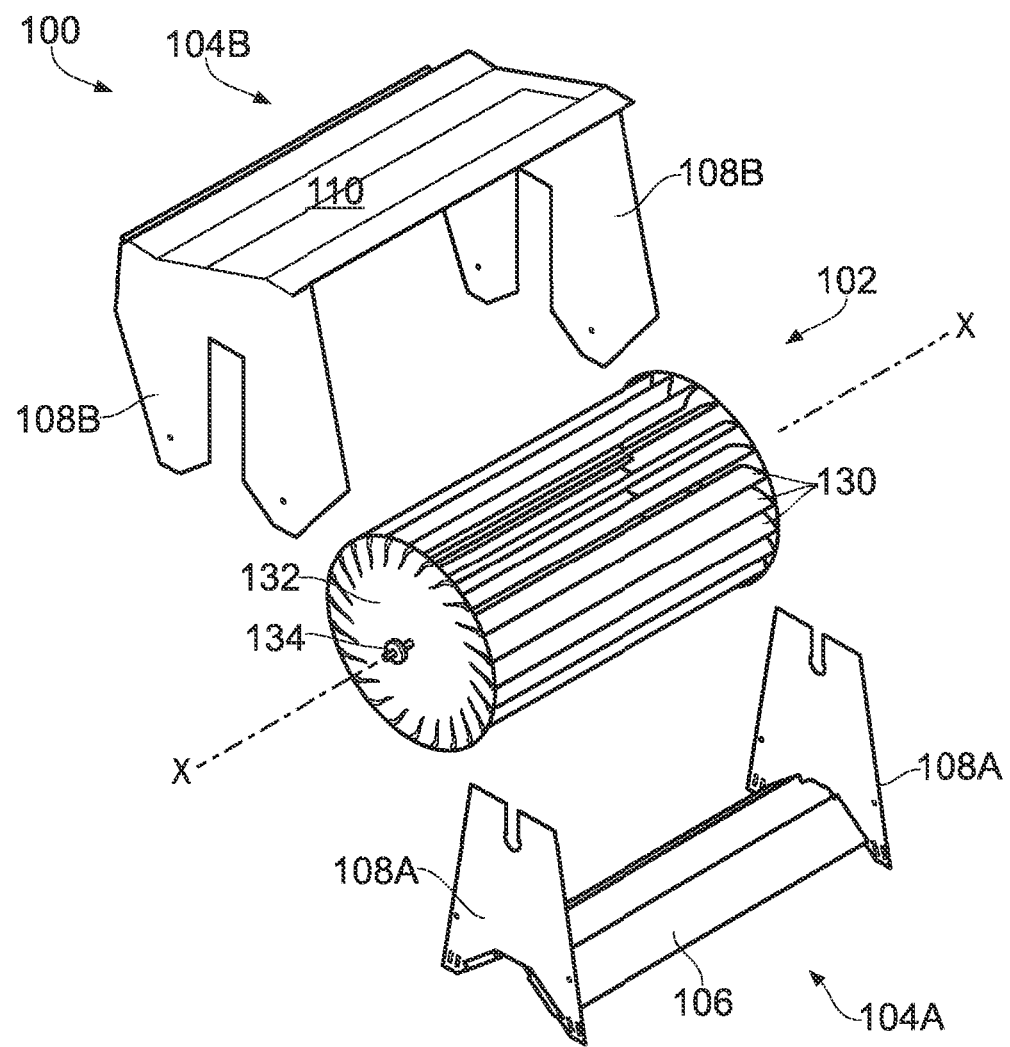
FIG. 1B shows an exploded view of components of the wind turbine assembly according to the present invention.
Figure 1D:
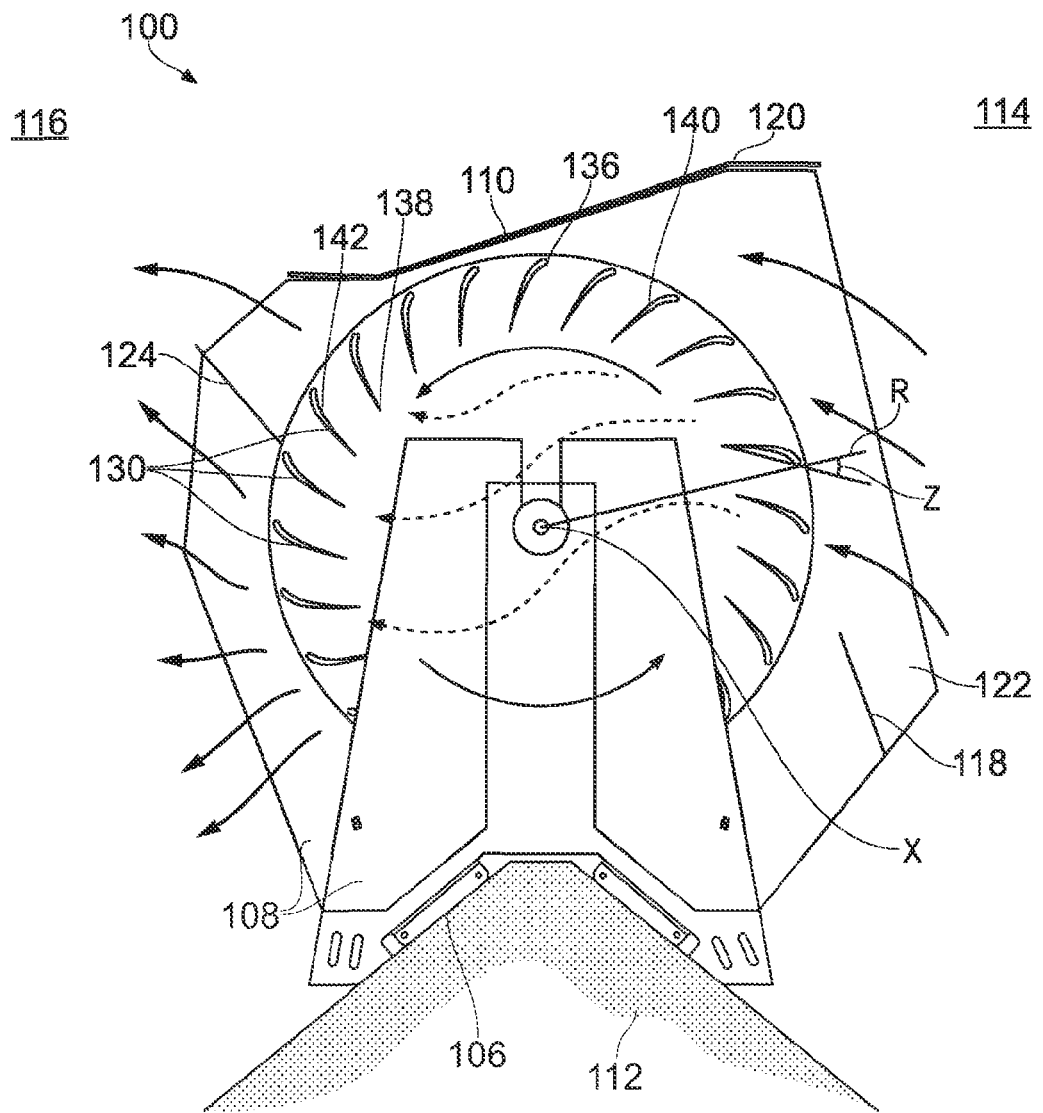
FIG. 1D shows the air flow through a cross-sectional view of a wind turbine assembly according to the present invention.

The housing 104 is asymmetric in axial cross-sectional view, having a front side 114 that provides an aerodynamically preferred side for receiving wind, such that the assembly 100 can be mounted with the front side aligned in correspondence with the prevailing wind direction (from the right hand side in FIG. 1D). However, the assembly 100 functions to generate electricity even when wind is received from the rear side 116.

An inlet air deflection slat 118 (omitted from FIG. 1B for clarity) is provided to mask the bottom of the rotor 102 from wind received by the front side 114 from the prevailing wind direction, and to deflect it upwards. The forward extension of the cover 120 and the forward extension of the end panels 122 extend forwards to provide a containment area for a raised air pressure zone, which feeds into the rotor. The presence of the raised air pressure zone provides a short-term buffering effect for the received wind to smooth variations in received wind speed and direction and correspondingly smooth the electrical output power. However, the forward extension of the end panels 120 should not be so great as to substantially limit the reception angle for receiving wind to the front side 114, relative to the axis of rotation of the rotor X. The cover 110 is shaped to reduce bleed-over of wind incident on the front side 114, and the rear side 116. Further, the cover 110 is shaped to funnel the air received at the front side 114 onto the blades 130 close to the cover.

An outlet air deflection slat 124 is provided on the rear side 116 to enhance the diffusion of air out of the assembly 100, to help reduce aerodynamic noise, and to reduce localised intense low pressure zones that may cause injury to wildlife, such as by damaging the sensitive lungs of bats.

The rotor 102 comprises a plurality of aerofoil blades 130 extending between two end plates 132 and having respective rotational bearings 134. The blades 130 are straight and extend parallel to the axis of rotation X of the rotor 102. However, it will be appreciated that alternatives are possible, akin to the arrangement of slightly curved and warped blades in the rotor of a cylinder lawn mower, in which the outer extent of each blade extends along the axis of rotation, being described along and around a cylindrical surface, locally slightly angled to that axis.

The aerofoil blades 130 are cambered and each have a leading edge 136, a trailing edge 138, a suction surface 140 and a pressure surface 142, and a chord 144 of length $L_C$ passing directly between the leading and trailing edges, and a camber 146 passing mid-way between the suction and pressure surfaces. Each blade 130 is arranged with the suction surface 140 facing away from the axis of rotation X, with the chord 144 angled relative to a radius R through the axis of rotation by an angle of inclination Z. The angle of inclination may be between 5° and 20°.

Figure 2A:
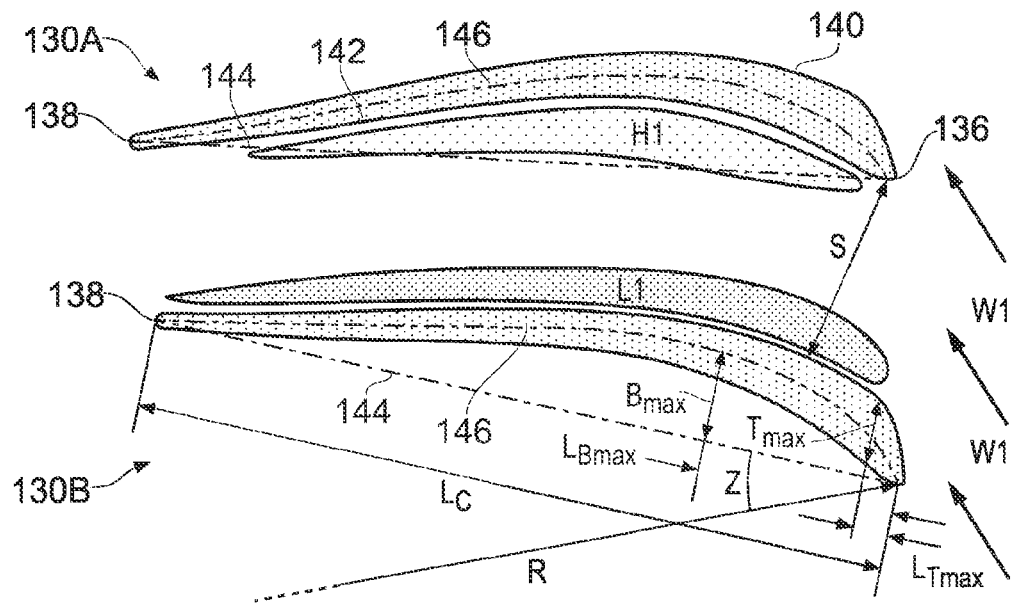
FIG. 2A shows the regions of low and high air pressure between two blade aerofoils of a wind turbine assembly according to the present invention in the case of a moderate wind speed.
Figure 2B:
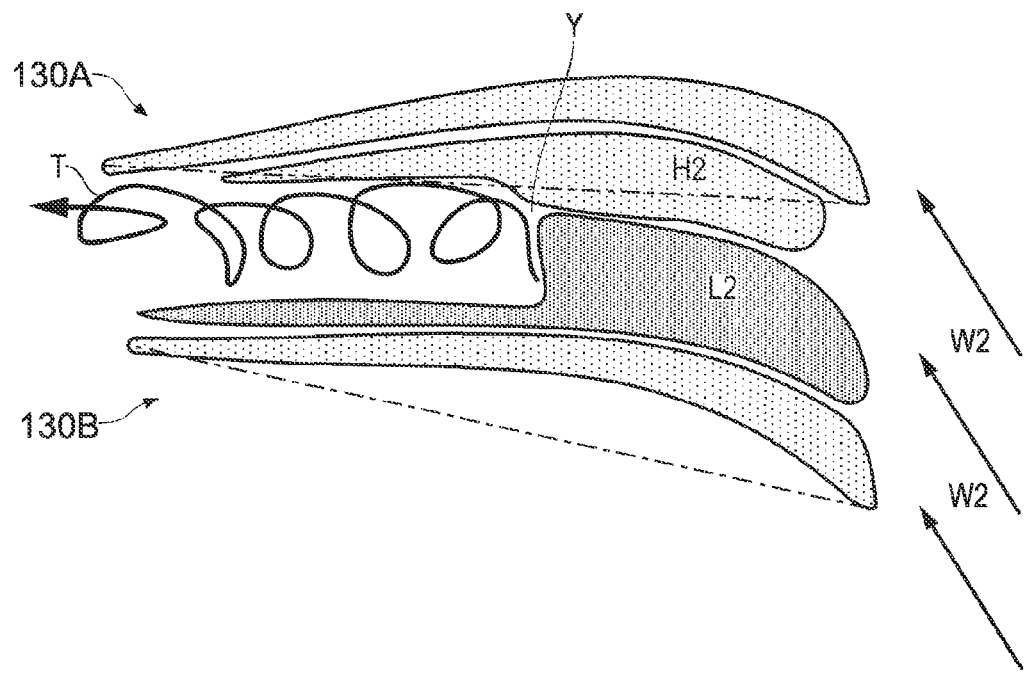
FIG. 2B shows the regions of low and high air pressure between two blade aerofoils of a wind turbine assembly according to the present invention in the case of a high wind speed.

FIGS. 2A and 2B illustrate a pair of adjacent blades 130A and 130B. The blades 130A and 130B are spaced apart around the rotor 102 such that there is a separation S between leading edge 136A of one blade 130A, and the adjacent suction surface 140 of the adjacent blade 130B (i.e. the blade 130B located in the direction faced by the pressure surface 142 of the first blade 130A). The separation S by which the blades are spaced apart is less than the chord length $L_C$.

Operation of the wind turbine is now described:

FIGS. 1C and 1D illustrate the air flow pattern when wind is received at the front side 114 of the wind turbine. The roof 112 and the inlet air deflection slat 118 channel the air up to the upper part of the rotor 102, where it passes between the blades 130 and into the interior of the rotor, guided by the cover 110. The air passes back out between the blades 130 from the interior of the rotor 102 to the rear side 116, where the outlet air deflection slat 124 increases the dispersion of air passing out from rear side 116.

FIG. 2A illustrates the airflow around a pair of adjacent blades 130A and 130B in the case of a low incident wind speed W1 received at the front side 114. As the air flows around the blades it generates a high pressure region H1 above the suction surface 140 and a low pressure region L1 beneath the pressure surface 142, and at low incident wind speeds these regions do not meet. Forces generated at the blades 130 that are within the air stream passing into and out of the rotor 102 generate torque on the rotor, causing it to rotate, with the blades advancing in the direction faced by their suctions surfaces 140. Advantageously, the combination of the rotation direction and angling of the blades provides a rotor that is safer and less prone to damage during use, in the event that an animal or other object should become attracted to the rotor, since it will be interact with the suction surfaces of the blades, rather than being struck by the leading edges of the blades.

Adjacent the cover 110, the blades 130 move in the direction of the air flow. In contrast, adjacent the support 106, the air flow is deflected upwards towards the cover, rather than being incident upon the blades as they pass the support, thereby reducing their aerodynamic drag as they move in the opposite direction from the prevailing wind direction. Forces are generated on the blades 130 by aerodynamic lift, drag and Newtonian reaction, both where the airflow passes around the blades 130 and enters the interior of the rotor 102, but also where the airflow passes around the blades again to exit the interior of the rotor.

An electricity generator (not shown) and electricity conversion electronics (not shown) are also provided, to harness the rotation of the rotor for the generation of electricity, and to convert the generated electricity into the correct format for output to a user or to be fed into an electricity supply network.

FIG. 2B illustrates the airflow around the pair of adjacent blades 130A and 130B of FIG. 2A in the case of a high incident wind speed W2 received at the front side 114. The speed of the air flow around the blades 130A and 130B is higher than in FIG. 2A. Accordingly, close to the leading edges 136 respective high pressure and low pressure regions H2 and L2 are wider than in FIG. 2A. However, part way along the length of the gap between the aerofoil blades 130A and 130B, the high and low pressure regions H2 and L2 grow sufficiently wide that they meet and interfere, generating turbulence T. The turbulence reduces the aerodynamic lift component of the force generated by the air flow around the blades, preventing it from growing quadratically with relative wind speed, as would otherwise occur.

Accordingly, by arranging the blades 130 on the rotor 102 close together, the output power at low wind speeds can be increased. Further, the output torque at extremely high wind speeds is automatically limited without the need for extra moving parts, such as a separate flow regulator or shutter. The requirements for the strength of any brake are reduced (the requirement for a brake may even be avoided). Yet further, the wind turbine assembly is less vulnerable to rapid changes in incident wind speed, reducing the requirements for the speed of response of any braking mechanism that might be used with the rotor. The electrical output power variation during unsteady high wind speeds is reduced. Further, by avoiding the need for an air flow regulator, the rotor may be designed with a greater mass of blades, providing the rotor with a correspondingly higher moment of inertia, which further stabilises the rotational speed of the rotor and the power output.

The threshold wind speed at which the high and low pressure regions H2 and L2 interfere varies with the blade separation S, the chord length $L_C$, and the aerofoil shape of the blade 130. Accordingly, the operational characteristics of the rotor 102 can be tailored by suitable choice of these parameters.

In an embodiment, the rotor 102 has 16 or 24 blades and a rotor diameter of 400 or 600 mm respectively, a rotor length of 1000 mm, the blades 130 have a chord length $L_C$ of 100 mm, and a separation S of 60 mm. In a turbine assembly 100 having such a rotor, mounted at the apex of a typical pitched roof, the onset of turbulence occurs at a wind speed entering housing of the turbine assembly of 25 mph (40 kph). Also, with such a number of blades, a useful amount of power can also be generated with speeds winds into the housing as low as 4 mph (6 kph).

At wind speeds below the turbulence threshold, the generated rotor torque increases as an approximately quadratic function of the wind speed received into the housing. Above the threshold wind speed for the onset of turbulence, the level of turbulence increases, and the location Y at which the turbulence starts moves closer to the leading edges of the blades, reducing the aerodynamic lift, compared with when such blades have a larger separation and such turbulence is absent. Advantageously, above the turbulence threshold, the generated torque continues to increase, but more gradually. Accordingly, above the turbulence threshold, the level of output power continues to increase with increasing wind speed, but advantageously the torque generated increases less rapidly than below the turbulence threshold, providing an approximately linear increase in generated torque with increasing wind speed into the housing. Accordingly, the present turbine assembly has a reduced susceptibility to damage compared with prior designs of wind turbine assemblies having a generally cylindrical wind turbine rotor. Further, such a wind turbine may continue to be operated in higher wind speeds than the prior designs.

For a given blade separation S and chord length $L_C$, the threshold wind speed at which the onset of turbulence occurs can be lowered by increasing the initial rate of growth of the high and low pressure regions. This can be achieved by use of blades with aerofoils that have the maximum chord thickness close to the leading edge. In the embodiment illustrated in FIGS. 2A and 2B, the maximum chord thickness $T_{max}$ occurs less than 10% of the chord length $L_C$, measured along the chord from the leading edge 136. The maximum chord thickness $T_{max}$ is preferably between 6 and 10% of the chord length $L_C$ (e.g. 6 to 10 mm, with a chord length $L_C$ of 100 mm). The location $L_{Bmax}$ of the maximum camber point $B_{max}$ is about 30% of the chord length $L_C$ from the leading edge.

The aerofoils of the illustrated blades 130A and 130B have a maximum chord thickness ($T_{max}$) of approximately 10% of the chord length ($L_C$), which provides a good performance compromise between providing high lift at low incident wind speed, to enhance output power in low wind conditions, and inducing lift-destroying turbulence between adjacent blades of the rotor at high incident wind speeds, to prevent excessive rotational speeding of the rotor. The coefficient of lift ($C_L$) of the aerofoils of the illustrated blades 130A and 130B have a value of at least 1.8 across an angle of incidence range (i.e. the angle of incidence acceptance range) of at least 15 degrees, which provides a consistently high level of lift as each rotor blade sweeps across the opening in the front of the housing.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A wind turbine assembly comprising a generally cylindrical wind turbine rotor that is supported by a rotor support and operable to rotate about a rotational axis,
   the rotor comprising a plurality of aerofoil blades with each aerofoil blade having a leading edge, a trailing edge, a suction surface, a pressure surface, and an aerofoil chord between the leading edge and the trailing edge,
   the aerofoil blades being in a generally cylindrical arrangement around the rotational axis with the leading edges at a larger radial separation from the rotational axis than the trailing edges, the chords being angled relative to radii through the rotational axis such that the suction surfaces and pressure surfaces respectively face generally outwardly and inwardly from and to the rotational axis,
   wherein the aerofoil blades have a common chord length ($L_C$) and the minimum separation (S) between the leading edge of each aerofoil blade and the suction surface of an adjacent aerofoil blade is less than the chord length ($L_C$),
   wherein there is a partial overlap, perpendicular to their chords, between the adjacent aerofoil blades, and
   wherein the location of the maximum thickness of each aerofoil blade ($L_{Tmax}$) along the chord is less than 10% of the chord length ($L_C$) from the leading edge.

2. The assembly according to claim 1, wherein the location of the maximum thickness of each aerofoil blade ($L_{Tmax}$) along the chord is at least 6% of the chord length ($L_C$) from the leading edge.

3. The assembly according to claim 1, wherein the maximum chord thickness ($T_{max}$) of each aerofoil blade is 5 to 15% of the chord length ($L_C$).

4. The assembly according to claim 1, wherein the blades are substantially parallel with the rotational axis.

5. The assembly according to claim 1, wherein the minimum separation (S) is less than 85% of the chord length ($L_C$).

6. The assembly according to claim 5, wherein the minimum separation (S) is less than 70% of the chord length ($L_C$).

7. The assembly according to claim 5, wherein the minimum separation (S) is greater than 50% of the chord length ($L_C$).

8. The assembly according to claim 1, wherein the minimum separation (S) is greater than 30% of the chord length ($L_C$).

9. The assembly according to claim 1, wherein the aerofoil blades are cambered aerofoil blades.

10. The assembly according to claim 1, wherein the rotor comprises 16 or 24 aerofoil blades.

11. The assembly according to claim 1, wherein the rotor has a diameter of 300 to 1000 mm.

12. The assembly according to claim 1, wherein the blades have a chord length of 50 to 200 mm.

13. The assembly according to claim 1, wherein the rotor support comprises a rotor housing and the rotor is rotatably supported within the rotor housing.

14. The assembly according to claim 13, wherein the rotor housing has an inlet air deflection slat configured to channel air flow incident into the rotor away from the support.

15. The assembly according to claim 13, wherein the rotor housing has an outlet air deflection slat configured to channel air flow exiting the rotor away from the support.

16. The assembly according to claim 1, wherein the rotor support is shaped in correspondence with an apex of a pitched roof.

* * * * *